(12) United States Patent
Ditzler et al.

(10) Patent No.: US 9,416,518 B2
(45) Date of Patent: Aug. 16, 2016

(54) BALL-AND-SOCKET JOINT FOR WORK VEHICLE

(75) Inventors: Steven J. Ditzler, Bellevue, IA (US); Bret A. Teusink, Dubuque, IA (US); Stanley L. Gassmann, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 983 days.

(21) Appl. No.: 12/679,070

(22) PCT Filed: Sep. 21, 2007

(86) PCT No.: PCT/US2007/020495
§ 371 (c)(1),
(2), (4) Date: May 19, 2010

(87) PCT Pub. No.: WO2009/038566
PCT Pub. Date: Mar. 26, 2009

(65) Prior Publication Data
US 2010/0232869 A1  Sep. 16, 2010

(51) Int. Cl.
*F16C 11/06* (2006.01)
*E02F 9/00* (2006.01)

(52) U.S. Cl.
CPC .............. *E02F 9/006* (2013.01); *F16C 11/069* (2013.01); *Y10T 403/32631* (2015.01); *Y10T 403/32737* (2015.01)

(58) Field of Classification Search
CPC ................................ E02F 9/006; F16C 11/069
USPC .......... 403/90, 115, 124, 135, 143, 125, 126, 403/132, 133, 137, 142; 285/261, 270, 271
See application file for complete search history.

(56) References Cited

U.S. PATENT DOCUMENTS

| | | | |
|---|---|---|---|
| 3,220,755 A | 11/1965 | Gottschald et al. | |
| 3,245,706 A * | 4/1966 | Rowlett | 403/135 |
| 3,705,631 A | 12/1972 | Seaberg | |
| 3,774,696 A | 11/1973 | Horsch | |
| 3,849,010 A | 11/1974 | Herbenar | |
| 4,201,268 A | 5/1980 | Frisbee | |
| 4,203,683 A * | 5/1980 | Rogers | 403/132 |
| 4,217,063 A | 8/1980 | Fischer et al. | |
| 4,248,311 A | 2/1981 | Frisbee et al. | |
| 4,286,363 A * | 9/1981 | Morin | 29/898.043 |
| 4,352,398 A | 10/1982 | Schantz | |
| 4,405,019 A | 9/1983 | Frisbee | |
| 4,828,044 A | 5/1989 | Horsch et al. | |

(Continued)

FOREIGN PATENT DOCUMENTS

| | | |
|---|---|---|
| DE | 2903621 A1 | 8/1980 |
| DE | 24157 A1 | 12/1986 |

(Continued)

OTHER PUBLICATIONS

D Series Grader Brochure (Feb. 2007) (3 pages).

(Continued)

*Primary Examiner* — Daniel P Stodola
*Assistant Examiner* — Matthew R McMahon

(57) ABSTRACT

A ball-and-socket joint (12) comprises a ball stud (32) comprising a ball (38) at an end thereof, and a socket (34) in which the ball (38) is positioned for relative movement between the ball (38) and the socket (34). An associated method is disclosed.

19 Claims, 5 Drawing Sheets

(56) References Cited

U.S. PATENT DOCUMENTS

| | | | |
|---|---|---|---|
| 4,893,683 | A | 1/1990 | Horsch et al. |
| 5,010,961 | A | 4/1991 | Frisbee |
| 5,152,566 | A | 10/1992 | Blatt et al. |
| 5,337,834 | A | 8/1994 | Tapphorn |
| 5,564,853 | A * | 10/1996 | Maughan ............... 403/137 |
| 5,678,947 | A * | 10/1997 | Urbach et al. ............ 403/288 |
| 6,010,271 | A * | 1/2000 | Jackson et al. ............ 403/131 |
| 6,010,272 | A | 1/2000 | Littman |
| 6,042,293 | A * | 3/2000 | Maughan ............... 403/135 |
| 6,273,198 | B1 | 8/2001 | Bauer et al. |
| 6,343,889 | B1 * | 2/2002 | Hendricks et al. ........ 403/143 |
| 6,439,794 | B2 * | 8/2002 | Schmidt ............... 403/120 |
| 6,623,485 | B2 | 9/2003 | Doubler et al. |
| 6,887,242 | B2 | 5/2005 | Doubler et al. |
| 6,941,685 | B2 | 9/2005 | Goy et al. |
| 7,121,355 | B2 | 10/2006 | Lumpkins et al. |
| 7,281,693 | B2 * | 10/2007 | Chou ............... 248/181.1 |
| 7,300,028 | B2 * | 11/2007 | Vogt ............... 248/181.1 |
| 7,690,441 | B2 | 4/2010 | Matsumoto et al. |
| 8,047,739 | B2 * | 11/2011 | Sellers et al. ........... 403/135 |
| 2005/0220531 | A1 | 10/2005 | Sellers et al. |
| 2007/0003360 | A1 | 1/2007 | Ditzler |
| 2009/0226244 | A1 * | 9/2009 | Byrnes et al. ........... 403/135 |

FOREIGN PATENT DOCUMENTS

| | | |
|---|---|---|
| GB | 2296288 A | 6/1996 |
| JP | 53-165976 | 6/1952 |
| JP | SHO54-165663 | 5/1953 |
| JP | 59-133818 | 8/1984 |
| JP | 60-154617 | 10/1985 |
| JP | 2000-55030 | 2/2000 |
| JP | 2002-89552 | 3/2002 |
| JP | 2002-097658 | 4/2002 |
| WO | 2007/032230 A1 | 3/2007 |

OTHER PUBLICATIONS

J Dozers Brochure: 450J, 550J, 650J (Apr. 2007) (24 pages).
J Dozers Brochure: 750J, 850J (May 2007) (24 pages).
International Search Report and Written Opinion of the International Searching Authority (Apr. 1, 2008) (9 pages).
International Preliminary Report on Patentability (Mar. 24, 2010) (8 pages).
First Official Action from Austrian Patent Office with English Translation (Feb. 18, 2011) (5 pages).
Background Information (1 page) (prior art).
Motor Grader Ball-and-Socket Joint (3 pages) (prior art).
Crawler Dozer With Ball-and-Socket Joint Interconnecting Blade and Frame of Blade Lift Mechanism (6 pages)(prior art).
China First Official Action Notice dated Aug. 24, 2011, in counterpart Chinese Application No. 2007801004239 (14 pages), including English translation.
Official Action from Austrian Patent Office in counterpart Austrian patent application, with English translation of Official Action including annotated claims (Jul. 25, 2011)(6 pages).
Office Action in Counterpart Chinese Application No. 2007801004239 and English Translation (May 30, 2012) (15 pages).
English Translation of Japanese Office Action in Counterpart Japanese Patent Application No. 2010-525789 (3 pages) (Jan. 21, 2013).
English Translation of Office Action in Corresponding Japanese Application No. 2010-525789, dated Nov. 21, 2013 (2 pages).

* cited by examiner

BALL-AND-SOCKET JOINT FOR WORK VEHICLE

FIELD OF THE DISCLOSURE

The present disclosure relates to a ball-and-socket joint for a work vehicle. An associated method is disclosed.

BACKGROUND OF THE DISCLOSURE

There are work vehicles such as crawler dozers and the like which have a blade for moving earth and other material. A ball-and-socket joint may be used, for example, to interconnect the blade and a blade lift mechanism. The ball-and-socket joint supports the blade during a change in attitude of the blade. Further, the joint provides support for the blade when raised and lowered by the blade lift mechanism.

SUMMARY OF THE DISCLOSURE

According to the present disclosure, there is provided a ball-and-socket joint for interconnecting components. The joint comprises a ball stud and a socket. The ball stud comprises a ball at an end thereof. The ball is positioned in the socket for relative movement between the ball and the socket. The socket comprises a base, an endless retainer ring, fasteners removably attaching the endless retainer ring to the base, and a split bearing ring. The split bearing ring cooperates with the base to define a bearing surface receiving the ball, and is captured by the endless retainer ring and the base therebetween upon attachment of the endless retainer ring to the base by the fasteners so as to retain the ball in the socket. In this way, the split retainer ring blocks the ball from pulling out of the socket, while the endless retainer ring acts both to retain the split bearing ring in place and to distribute among all the fasteners a load transmitted thereto. Such load distribution promotes the overall strength of the joint.

Exemplarily, the ball-and-socket joint may be used on a work vehicle or other apparatus so as to interconnect first and second components thereof. The first component may be, for example, a blade, or other tool, and the second component may be, for example, a blade lift mechanism, or other tool mount. In such an example, the endless retainer ring is thus configured to distribute a load applied to the first component (e.g., blade or other tool) among the fasteners.

Upon wear of the ball, one or more shims may be removed from between the endless retainer ring and the base, after which the fasteners may be tightened. Such tightening advances the endless retainer ring toward the base causing the endless retainer ring to cam opposite ends of the split retainer ring relative to one another decreasing the inner diameter of the split bearing ring so as to improve the fit of the split bearing ring about the ball (i.e., increase conformity of the split bearing ring about the ball). In this way, the ball-and-socket joint may be readily adjusted to accommodate wear on the ball.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
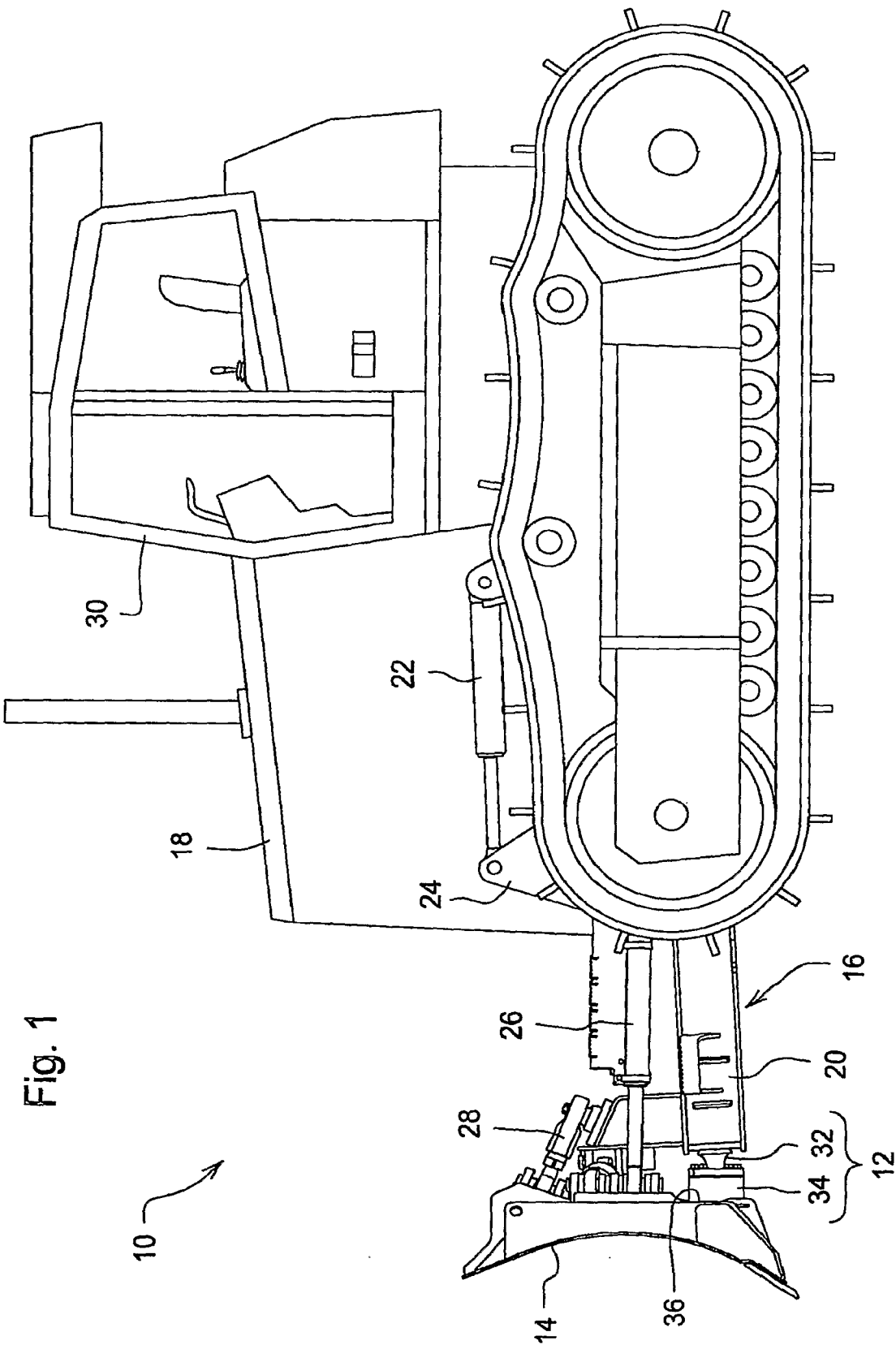
FIG. 1 is a perspective view of a work vehicle, in the form of, for example, a dozer, having a ball-and-socket joint interconnecting a blade and a blade lift mechanism.

Referring to FIG. 1, there is shown a work vehicle 10 in the form of, for example, a dozer. As such, the work vehicle 10 may have a ball-and-socket joint 12 interconnecting a first component in the form of, for example, a blade 14 or other tool, and a second component in the form of, for example, a blade lift mechanism 16, or other tool mount, attached to a base machine 18 of the vehicle 10. For ease of description, the first and second components are referred to in this section as the blade 14 and blade lift mechanism 16, respectively, but it is to be understood that the joint 12 may be used to interconnect a wide variety of other components.

The joint 12 accommodates a variety of movement of the blade 14. For example, it facilitates yawing and rolling of the blade 14 relative to a frame 20 (e.g., a C-frame) of the blade lift mechanism 16, and facilitates vertical movement of the blade 14 with the frame 20 upon operation of the blade lift mechanism 16. The frame 20 is attached to the base machine 18 for vertical, pivotable movement relative thereto in response to a change in length of lift cylinders 22 on either side of the base machine 18. Each lift cylinder 22 is attached to the frame 20 via a respective tower 24. A pair of yaw cylinders 26, each extending between a respective tower 24 and the blade 14, cooperate to yaw the blade 14 about a generally vertical axis. A roll cylinder 28 is operable to roll the blade 14 about a generally horizontal axis. The joint 12 thus facilitates yawing, rolling, and vertical movement of the blade 14, all of which may be controlled automatically and/or manually by inputs from an operator located, for example, at the operator's station 30.

Illustratively, the joint 12 is attached to the frame 20 and the blade 14. For example, a ball stud 32 of the joint 12 may be attached to the frame 20 in fixed relation thereto, and a socket 34 of the joint 12 may be attached to a rear wall 36 of the blade 14 in fixed relation thereto.

Figure 2:
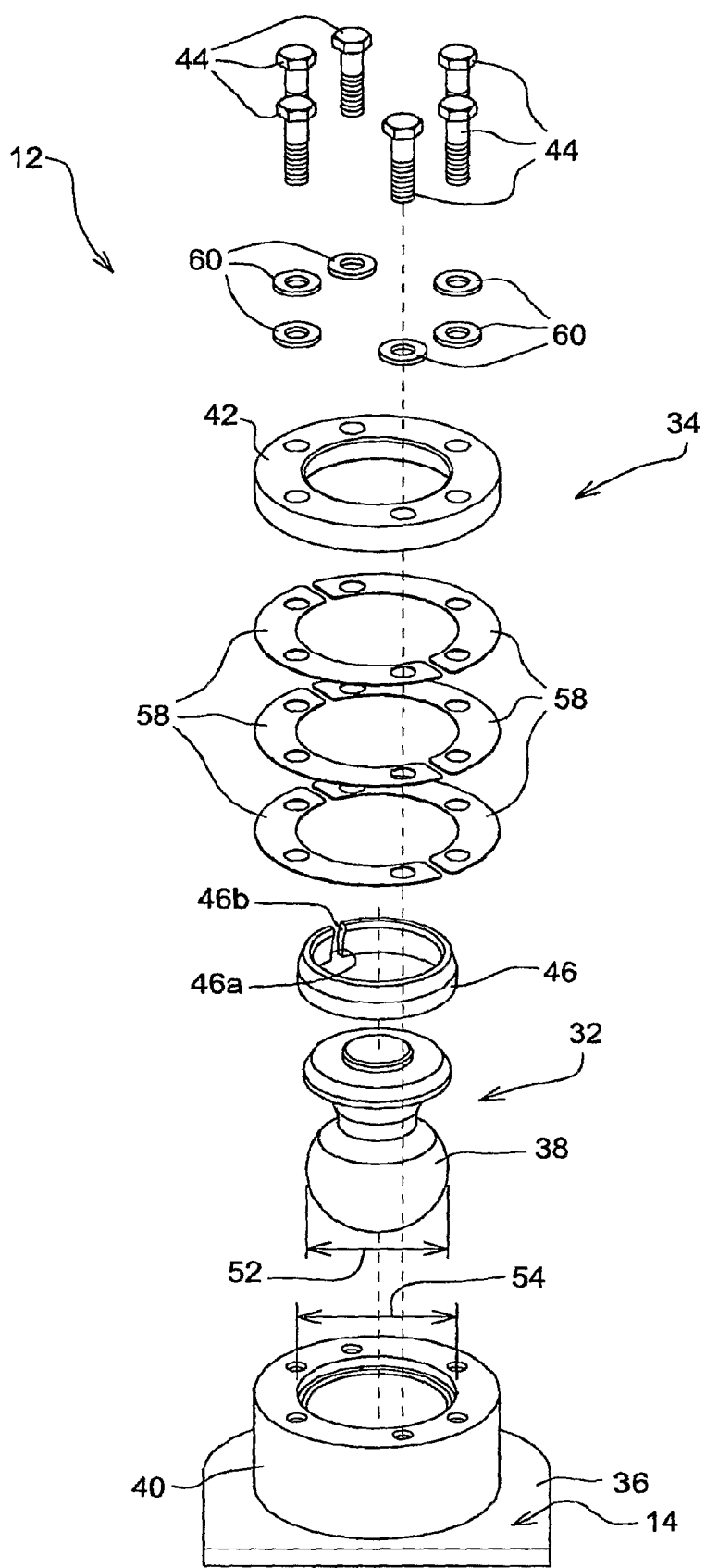
FIG. 2 is an exploded perspective view of the ball-and-socket joint.
Figure 3:
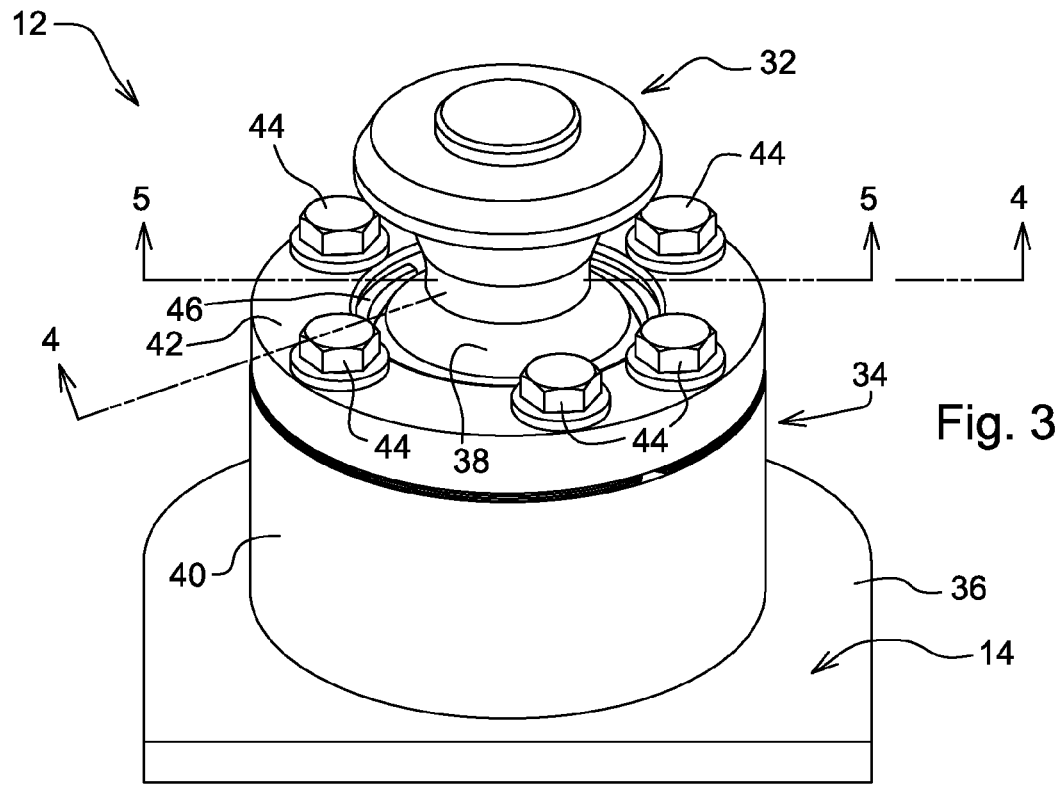
FIG. 3 is a perspective view of the ball-and-socket joint.
Figure 4:
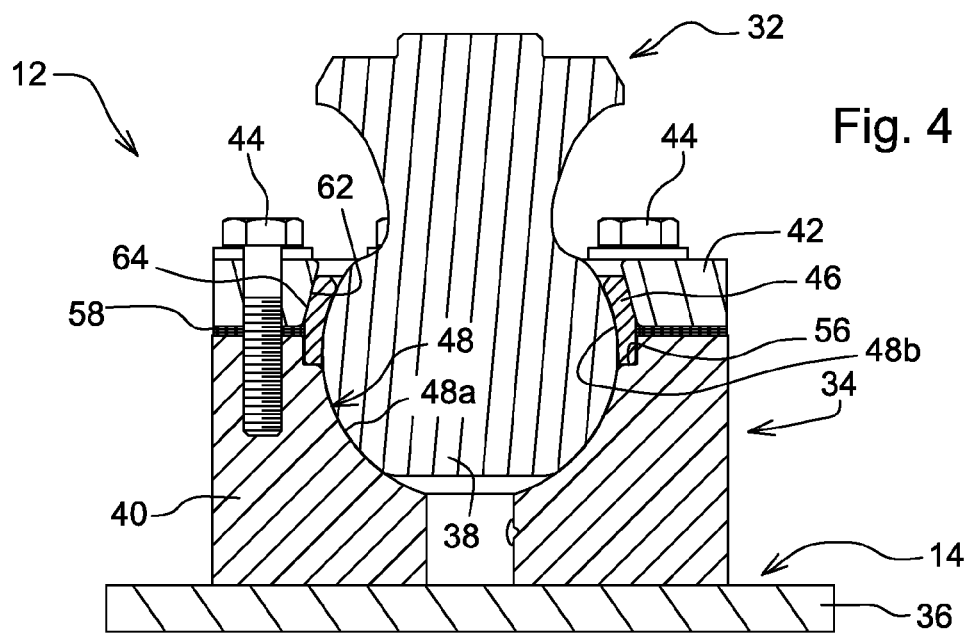
FIG. 4 is a sectional view taken along lines 4-4 of FIG. 3 showing a socket in which fasteners removably attach an endless retainer ring to a base so as to capture a split retainer ring therebetween blocking pullout of the ball.

Referring to FIGS. 2-4, the construction of the joint 12 is shown. The ball stud 32 comprises a ball 38 at an end of the ball stud 32. The ball 38 is positioned in the socket 34 for relative movement between the ball 38 and the socket 34. The socket 34 comprises a base 40 attached to the rear wall 36, an endless retainer ring 42, fasteners 44 removably attaching the endless retainer ring 42 to the base 40, and a split bearing ring 46 that cooperates with the base 40 to define a bearing surface 48 receiving the ball 38 and that is captured by the endless retainer ring 42 and the base 40 therebetween upon attachment of the endless retainer ring 42 to the base 40 by the fasteners 44 so as to retain the ball 38 in the socket 34. As such, the endless retainer ring 42 is configured to distribute a load transmitted thereto among all the fasteners 44. Such a load may be applied to the blade 14 and transmitted to the endless retainer ring 42 via the base 40, as shown, for example, in FIG. 7 with respect to load 50.

During assembly of the socket 12, the ball stud 32 is attached (e.g., welded) to the frame 20, after which the endless retainer ring 42 is slipped over the ball 38 onto the ball stud 32 so that the ball 38 passes through the central hole formed in the ring 42. The inner diameter 52 of the endless retainer ring 42 is greater than the outer diameter 54 of the ball 38 so as to allow such relative movement between the ring 42 and the ball 38.

The ball 38 is inserted into the base 40 against the portion 48a of the bearing surface 48 defined by the base 40. The bearing surface portion 48a thus limits insertion of the ball 38 into the socket 34. The bearing surface portion 48a of the base 40 is concave in shape so as to mate with the outer surface of the ball 38.

The split bearing ring 46 is fitted around the ball 38, and positioned on a shoulder 56 of the ball 38. One or more shims 58 may be positioned between the endless retainer ring 42 and the base 40 and disposed about the split bearing ring 46, the number of such shims 58 being sufficient so as to retain the ball 38 in the socket 34 when the endless retainer ring 42 is attached to the base 40. Each fastener 44 (e.g., a bolt) is advanced through an associated washer 60, the endless retainer ring 42, and shim(s) 58, if any, into threaded holes formed in the base 40.

Tightening of the fasteners 44 results in relative movement between the endless retainer ring 42 and the base 40 toward one another which, in turn, causes the endless retainer ring 42 to cam opposite ends 46a, 46b of the split retainer ring 46 relative to one another (e.g., toward one another) decreasing the inner diameter of the split bearing ring 46 so as to improve the fit of the split bearing ring 46 about the ball 38. Such compression of the split bearing ring 46 provides a relatively precise fit of the ring 46 about the ball 38. As such, an inner chamfer or taper 62 formed on an inner surface of the endless retainer ring 42 as a cam surface contacts and mates with an outer chamfer or taper 64 formed on an outer surface of the split bearing ring 42 as a cam follower surface.

When the joint 12 is assembled, the portion 48b of the bearing surface 48 defined by the split bearing ring 46 blocks pullout of the ball 38 from the socket 34. Further, the endless retainer ring 42 presses the split bearing ring 54 onto the shoulder 56, capturing the split bearing ring 46 between the endless retainer ring 42 and the base 40. As such, the portions 48a, 48b of the base 40 and the split bearing ring 46 are flush with one another and cooperate to provide the bearing surface 48 against which the ball 38 bears upon movement of the blade 14 relative to the blade lift mechanism 16 and upon vertical movement of the blade lift mechanism 16.

Although the split bearing ring 46 may be made of any bearing material, the split bearing ring 46 is made of, for example, nickel bronze or other bronze material. The nickel bronze material inhibits galling of the ball 38. Nickel bronze has a relatively high strength compared to other bronze materials, yet has a similar modulus of elasticity, enabling the ring 46 to stretch more and snap over the ball 38 without breaking. Exemplarily, the split bearing ring 46 is softer than the ball 38 so that the wear occurs in the ring 46, and this is the case if the ring 46 is made of a bronze material such as nickel bronze and the ball 38 is made of hardened steel. Wear in the ring 46, rather than the ball 38, promotes the adjustability benefit of the joint 12 discussed in more detail below.

Figure 5:
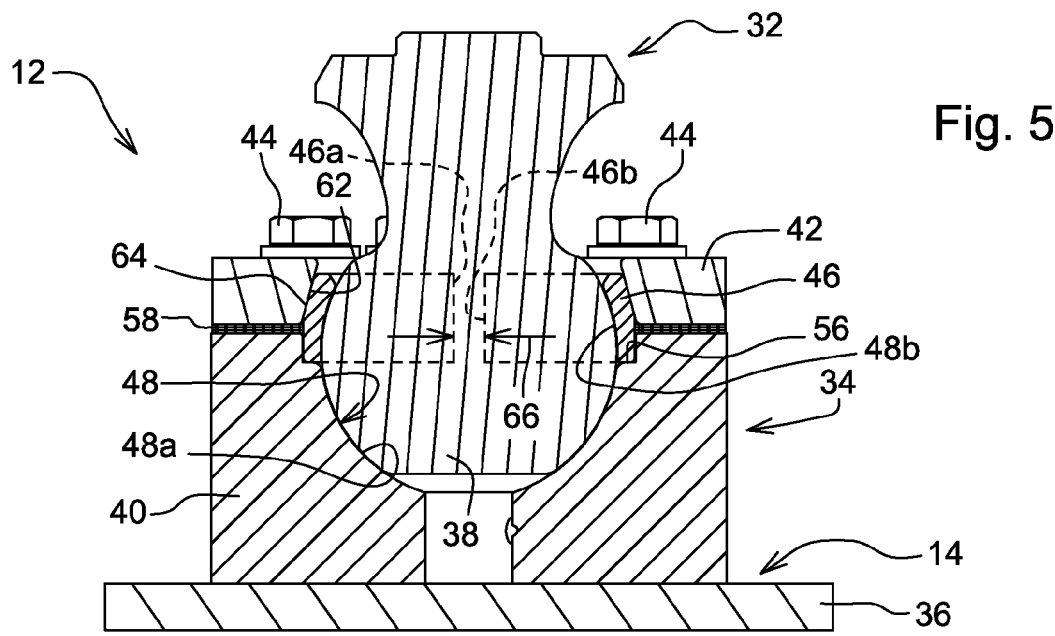
FIG. 5 is a sectional view taken along lines 5-5 of FIG. 3 showing the socket sized to accommodate the ball.
Figure 6:
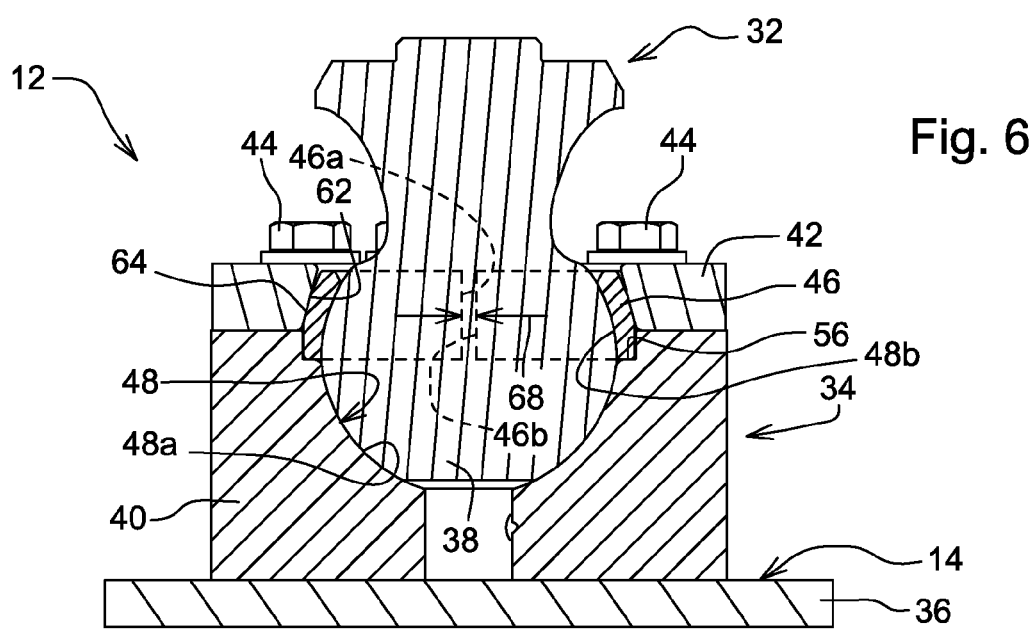
FIG. 6 is a sectional view similar to FIG. 5 showing the socket resized to accommodate wear on the ball and/or socket.

Referring to FIGS. 5 and 6, the joint 12 is configurable to adjust the fit of the socket 34 about the ball 38, promoting ease of maintenance of the joint 12. More particularly, the split bearing ring 46 is compressible for adjusting the bearing clearance between the ball 38 and the bearing surface 48. Over time, the joint 12 may wear, in particular, the split bearing ring 46, increasing the bearing clearance between the ball 38 and the bearing surface 48. In order to take up this clearance, the fasteners 44 may be loosened and one or more shims 58 may be removed from between the endless retainer ring 42 and the base 40, as shown, for example, in FIGS. 5 and 6 wherein there are more shims 58 in FIG. 5 than in FIG. 6. Although FIG. 6 shows that all shims 58 have been removed, it is to be understood that, in some cases, it may not be necessary to remove all shims 58.

Thereafter, the fasteners 44 may be tightened resulting in relative movement between the endless retainer ring 42 and the base 40 toward one another causing the endless retainer ring 42 to cam the opposite ends 46a, 46b relative to one another (e.g., toward one another) decreasing the inner diameter of the split bearing ring 46 so as to improve the fit of the split bearing ring 46 about the ball 38 and thus the bearing clearance between the ball 38 and the bearing surface 48. Illustratively, in FIG. 5, the ends 46a, 46b are spaced a distance 66 apart from one another, whereas, in FIG. 6, the ends 46a, 46b are spaced a distance 68 apart from one another, the distance 68 being smaller than the distance 66.

Figure 7:
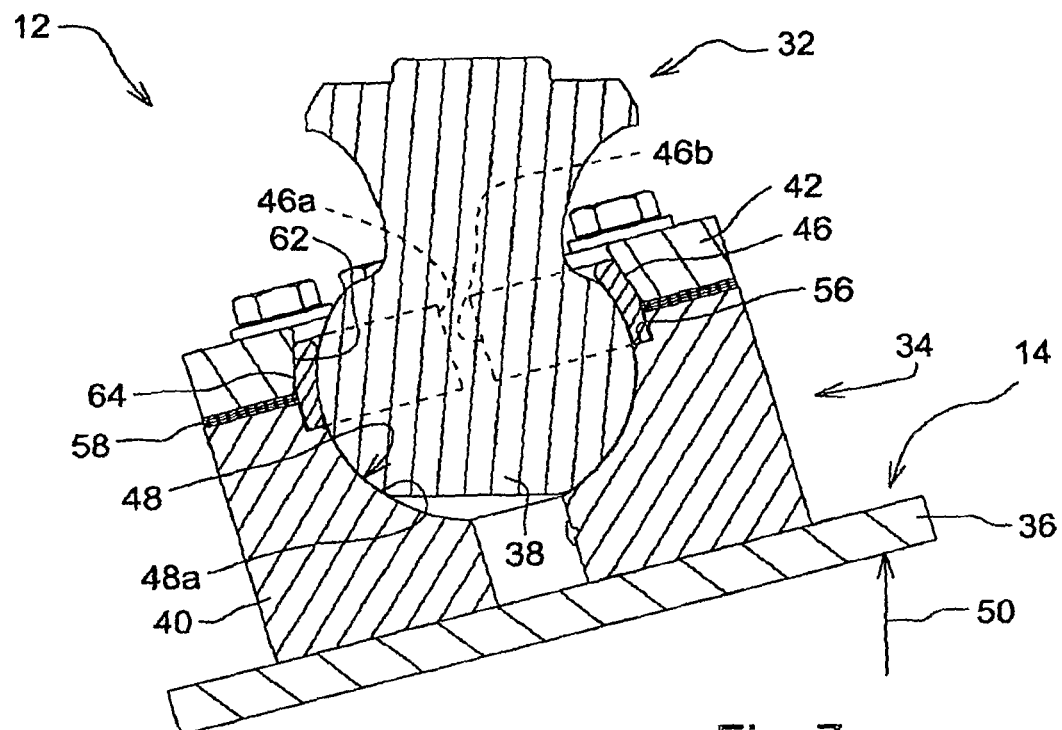
FIG. 7 is sectional view similar to FIG. 5 showing application of a load to a blade.

Referring to FIG. 7, as alluded to above, the retainer ring 42 is endless so as to distribute a load 50 among all the fasteners 44. For example, the blade 14 may be angled (yawed) with a load 50 applied thereto. Although mainly one side of the ring 42 may receive the load 50 in such a blade orientation, because the ring 42 is endless, the ring 42 is able to distribute this load 50 among all the fasteners 44. Such load distribution capability promotes the useful life of the joint 12.

As indicated above, in general, the joint 12 may be used to interconnect first and second components, the use of the joint 12 for interconnecting the blade 14 and blade lift mechanism 16 being an example. In other applications, the joint 12 could be used to replace spherical bushing joints, such as, for example, those on a crawler.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A ball-and-socket joint, comprising:
   a ball stud comprising a ball at an end thereof, and
   a socket in which the ball is positioned for relative movement between the ball and the socket, the socket comprising a base, an endless retainer ring, fasteners removably attaching the endless retainer ring to the base, and a split bearing ring that is positioned on the base, cooperates with the base to define a bearing surface receiving the ball, and is captured by the endless retainer ring and the base therebetween upon attachment of the endless retainer ring to the base by the fasteners so as to retain the ball in the socket.

2. The ball-and-socket joint of claim 1, wherein the endless retainer ring is configured to distribute a load transmitted thereto among all the fasteners.

3. The ball-and-socket joint of claim 1, wherein the endless retainer ring comprises a cam surface in contact with the split bearing ring to cam opposite ends of the split bearing ring relative to one another in response to relative movement between the endless retainer ring and the base toward one another upon tightening of the fasteners.

4. The ball-and-socket joint of claim 1, wherein the endless retainer ring comprises an inner chamfer, and the split bearing ring comprises an outer chamfer mating with the inner chamfer.

5. The ball-and-socket joint of claim 1, wherein the base comprises an end surface facing toward the endless retainer ring in an axial direction relative to an axis of the socket and configured to receive a shim thereon and a shoulder recessed axially from the end surface relative to the axis, and the shoulder comprises a shoulder surface facing in the axial direction and positioned in fixed relation to the end surface and on which the split bearing ring is positioned.

6. The ball-and-socket joint of claim 5, comprising a shim removably positioned between the endless retainer ring and the base on the end surface of the base apart from the shoulder surface, wherein the split bearing ring is positioned on the shoulder surface both when the shim is positioned between the endless retainer ring and the base and when the shim is absent between the endless retainer ring and the base.

7. The ball-and-socket joint of claim 5, wherein the split bearing ring is positioned in contact with the endless retainer ring and the shoulder surface.

8. The ball-and-socket joint of claim 1, wherein the endless retainer ring comprises an innermost diameter greater than an outermost diameter of the ball.

9. The ball-and-socket joint of claim 1, comprising a shim positioned between the endless retainer ring and the base and disposed about the split bearing ring.

10. The ball-and-socket joint of claim 1, wherein the portion of the bearing surface defined by the split bearing ring blocks pullout of the ball from the socket, and the portion of the bearing surface defined by the base limits insertion of the ball into the socket.

11. The ball-and-socket joint of claim 10, wherein each of the portion of the bearing surface defined by the split bearing ring and the portion of the bearing surface defined by the base mates with an outer surface of the ball.

12. The ball-and-socket joint of claim 1, wherein the split bearing ring is made of a material softer than the ball.

13. The ball-and-socket joint of claim 1, wherein the endless retainer ring is attached axially to the base relative to an axis of the socket, and the split bearing ring is captured by the endless retainer ring and the base against axial movement relative to the endless retainer ring and the base along the axis.

14. The ball-and-socket joint of claim 1, wherein the split bearing ring is positioned in contact with the endless retainer ring and the base.

15. The ball-and-socket joint of claim 1, wherein the split bearing ring is positioned between the endless retainer ring and the ball, spacing the endless retainer ring and the ball apart from one another.

16. The ball-and-socket joint of claim 1, wherein the split bearing ring provides a first bearing portion of the bearing surface, the base provides a second bearing portion of the bearing surface, and the first bearing portion and the second bearing portion are positioned respectively on opposite sides of an equator of the ball.

17. The ball-and-socket joint of claim 1, wherein the endless retainer ring drives opposite ends of the split bearing ring toward one another as the split bearing ring reacts on the base in response to relative movement between the endless retainer ring and the base toward one another upon tightening of the fasteners.

18. The ball-and-socket joint of claim 17, wherein the base comprises an end surface facing toward the endless retainer ring in an axial direction relative to an axis of the socket and configured to receive a shim thereon and a shoulder recessed axially from the end surface relative to the axis, the shoulder comprises a shoulder surface facing in the axial direction and positioned in fixed relation to the end surface and on which the split bearing ring is positioned and reacts upon tightening of the fasteners, and the endless retainer ring comprises an innermost diameter greater than an outermost diameter of the ball.

19. A work vehicle comprising the ball-and-socket joint of claim 1, a blade, and a blade lift mechanism, wherein the blade is attached to the base, the blade lift mechanism is attached to the ball stud, and the endless retainer ring comprises an innermost diameter greater than an outermost diameter of the ball.

* * * * *